United States Patent
Chan et al.

(10) Patent No.: US 10,558,820 B2
(45) Date of Patent: Feb. 11, 2020

(54) SYSTEM AND METHOD FOR MAINTAINING A SEGREGATED DATABASE IN A MULTIPLE DISTRIBUTED LEDGER SYSTEM

(71) Applicant: The Toronto-Dominion Bank, Toronto (CA)

(72) Inventors: Paul Mon-Wah Chan, Toronto (CA); Perry Aaron Jones Haldenby, Toronto (CA); John Jong Suk Lee, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 16/358,883

(22) Filed: Mar. 20, 2019

(65) Prior Publication Data

US 2019/0220621 A1 Jul. 18, 2019

Related U.S. Application Data

(62) Division of application No. 15/255,236, filed on Sep. 2, 2016, now Pat. No. 10,282,558.

(51) Int. Cl.
*G06F 21/62* (2013.01)
*G06F 21/64* (2013.01)
(Continued)

(52) U.S. Cl.
CPC ........ *G06F 21/6245* (2013.01); *G06F 21/606* (2013.01); *G06F 21/6227* (2013.01);
(Continued)

(58) Field of Classification Search
CPC .... G06F 21/606; G06F 21/64; G06F 21/6245; G06Q 40/00; H04L 2209/38
(Continued)

(56) References Cited

U.S. PATENT DOCUMENTS 6,249,866 B1 6/2001 Brundrett et al.
6,874,089 B2 3/2005 Dick et al.
(Continued)

FOREIGN PATENT DOCUMENTS

WO WO 2014/201059 A1 12/2014
WO WO 2015/171580 A1 11/2015

OTHER PUBLICATIONS

Murray, "All aboard the blockchain express," KM World, vol. 24.4, Mar. 31, 2015 (2 pages).
(Continued)

*Primary Examiner* — Jason K Gee
*Assistant Examiner* — Dereena T Cattungal
(74) *Attorney, Agent, or Firm* — Duane Morris LLP

(57) ABSTRACT

An apparatus maintains a segregated database in a multiple distributed ledger system. The apparatus includes a storage device that stores software instructions for controlling a processor that when executed by the processor configure the processor to: create distributed ledgers, each created distributed ledger being associated with a respective individual profile; maintain a segregated database apart from the distributed ledgers including, for each individual profile, profile balance data; and process a data exchange between exchanging profiles. To process the data exchange, the processor is configured to receive data exchange data regarding parameters of the data exchange; approve the data exchange based on a check of the data exchange data against profile balance data in the database; access the distributed ledgers associated with the exchanging profiles; and cause a distributed ledger data exchange corresponding to the data exchange to be added to the accessed distributed ledgers when the data exchange is approved.

20 Claims, 8 Drawing Sheets

(51) Int. Cl.
  *G06F 21/60* (2013.01)
  *G06Q 40/00* (2012.01)
(52) U.S. Cl.
  CPC ............ *G06F 21/64* (2013.01); *G06Q 40/00* (2013.01); *H04L 2209/38* (2013.01)
(58) Field of Classification Search
  USPC .......................................................... 726/30
  See application file for complete search history.

(56) References Cited

U.S. PATENT DOCUMENTS

| | | |
|---|---|---|
| 6,986,043 B2 | 1/2006 | Andrew et al. |
| 7,082,534 B2 | 7/2006 | Tardo |
| 8,285,967 B1 | 10/2012 | Veeraswamy et al. |
| 8,295,489 B2 | 10/2012 | Sung et al. |
| 8,416,954 B1 | 4/2013 | Raizen et al. |
| 8,510,552 B2 | 8/2013 | De Atley et al. |
| 8,788,842 B2 | 7/2014 | Brouwer et al. |
| 2005/0213751 A1 | 9/2005 | Apostolopoulos |
| 2007/0125840 A1 | 6/2007 | Law et al. |
| 2011/0029370 A1 | 2/2011 | Roeding et al. |
| 2011/0178926 A1 | 7/2011 | Lindelsee et al. |
| 2013/0042112 A1 | 2/2013 | Spector |
| 2014/0156529 A1* | 6/2014 | Pinault ................. G06Q 20/065 705/44 |
| 2014/0244500 A1 | 8/2014 | Elias |
| 2014/0344015 A1 | 11/2014 | Puertolas-Montanes et al. |
| 2015/0081566 A1 | 3/2015 | Slepinin |
| 2015/0081567 A1* | 3/2015 | Boyle ................ G06Q 20/3829 705/71 |
| 2015/0206106 A1 | 7/2015 | Yago |
| 2015/0220928 A1 | 8/2015 | Allen |
| 2015/0227922 A1 | 8/2015 | Filler |
| 2016/0260169 A1* | 9/2016 | Arnold ................... G06Q 40/12 |
| 2016/0283942 A1 | 9/2016 | Andrade |
| 2017/0287068 A1 | 10/2017 | Nugent |
| 2017/0316390 A1 | 11/2017 | Smith |
| 2017/0329980 A1 | 11/2017 | Hu |
| 2019/0028277 A1* | 1/2019 | Jayachandran ....... H04L 9/3247 |
| 2019/0180266 A1* | 6/2019 | Sidhu ................... G06Q 20/223 |

OTHER PUBLICATIONS

Swan, "Blockchain: Blueprint for a New Economy," O'Reilly Media, Inc., Feb. 8, 2015 (153 pages).

Peters et al., "Understanding Modern Banking Ledgers through Blockchain Technologies: Future of Transaction Processing and Smart Contracts on the Internet of Money," Nov. 18, 2015 (34 pages).

* cited by examiner

SYSTEM AND METHOD FOR MAINTAINING A SEGREGATED DATABASE IN A MULTIPLE DISTRIBUTED LEDGER SYSTEM

CROSS-REFERENCE TO RELATED APPLICATION

This application is divisional of and claims the benefit of priority to U.S. application Ser. No. 15/255,236, filed Sep. 2, 2016, the disclosure of which is incorporated herein by reference to its entirety.

FIELD OF THE INVENTION

The disclosed embodiments generally relate to computerized systems and methods for securing data, and more particularly, and without limitation, to computerized systems and methods that generate a segregated database for a multiple distributed ledger system.

BACKGROUND OF THE INVENTION

Today, virtual and crypto-currencies, such as Bitcoin™, are gaining acceptance as viable mechanisms for performing purchase transactions and other financial services. The transfer of units of these virtual and crypto-currencies between owners, which is essential to the ultimate success of these virtual and crypto-currencies, relies on a robust blockchain ledger structure that, due to its public nature, redundant verification, and resistance to fraudulent activity, offers advantages over existing centralized server systems.

The main advantage of a distributed ledger is the public nature of its architecture that allows anyone in the public to review content of the ledger and verify ownerships. Its decentralized approach also makes the system fairly robust in comparison to centralized server systems by allowing multiple distributed networks to verify the contents of a single ledger. This allows for redundancy and renders falsification of ledgers nearly obsolete. Despite its many advantages, the use of distributed, blockchain based ledger systems has significant flaws for use in secure, high-risk systems.

For example, the lack of encryption of the ledger entries raises security concerns for transactions of a sensitive nature, or at least privacy concerns for members of the general public. Central authorities such as governments or banks have a duty to maintain privacy of various transactions. For example, how a previous owner of a product or account interacted with the product or account is private information that should not be available to future owners, let alone members of the public.

Scalability of blockchain is also a concern. Though standard computing devices may be able to process a large volume of transactions through the blockchain, searching for specific transactions for a specific address is not an easy task in a large distributed public ledger.

Therefore, there are technical challenges that must be overcome with using distributed ledger based asset tracking in sensitive or regulated environments where privacy is a concern or is required.

SUMMARY OF THE INVENTION

In embodiments, an apparatus for managing maintaining a segregated database in a multiple distributed ledger system includes a storage device and a processor coupled to the storage device. The storage device stores software instructions for controlling the processor that when executed by the processor configure the processor to: create distributed ledgers, each created distributed ledger being associated with a respective individual profile; maintain a segregated database apart from the distributed ledgers including, for each individual profile, profile balance data; and process a data exchange between exchanging profiles. To process the data exchange, the processor is configured to receive data exchange data regarding parameters of the data exchange; approve the data exchange based on a check of the data exchange data against profile balance data in the database; access the distributed ledgers associated with the exchanging profiles; and cause a distributed ledger data exchange corresponding to the data exchange to be added to the accessed distributed ledgers when the data exchange is approved.

In embodiments, an apparatus for maintaining a segregated database in a multiple distributed ledger system, includes a storage device; and a processor coupled to the storage device, the storage device storing software instructions for controlling the processor that when executed by the processor configure the processor to: create distributed ledgers, each created ledger being associated with a respective individual profile; maintain a token repository database apart from the distributed ledgers including, for each individual profile, profile balance data; and process a data exchange between exchanging profiles, including: receive data exchange data regarding parameters of the data exchange and a token associated with a first one of the exchanging profiles; approve the data exchange based on a check of the data exchange data and the received token against the token repository database; and when the transaction is approved: create a new token for the first one of the exchanging profiles and a token for a second one of the exchanging profiles; access the ledgers associated with the exchanging profiles; and cause a ledger entry corresponding to the data exchange to be added to the accessed ledgers, the ledger entry added to the accessed ledger for the first one of the exchanging profiles including the created new token for the first one of the exchanging profiles and the blockchain transaction added to the accessed ledger of the second one of the exchanging profiles including the created token for the second one of the exchanging profiles.

In embodiments, a computer implemented method includes the steps of: creating with a processor distributed ledgers, each created distributed ledger being associated with a respective individual profile; maintaining with the processor a segregated database apart from the distributed ledgers including, for each individual profile, profile balance data; and processing with a processor a data exchange between exchanging profiles. The processing step includes the steps of: receiving data exchange data regarding parameters of the data exchange; approving the data exchange based on a check of the data exchange data against profile balance data in the database; accessing the ledgers associated with the exchanging profiles; and causing a distributed ledger data exchange corresponding to the data exchange to be added to the accessed distributed ledgers when the data exchange is approved.

The above and other features of the present invention will be better understood from the following detailed description of the preferred embodiments of the invention that is provided in connection with the accompanying drawings.

BRIEF DESCRIPTION OF THE DRAWINGS

The accompanying drawings illustrate preferred embodiments of the invention, as well as other information pertinent to the disclosure, in which.

DETAILED DESCRIPTION

This description of the exemplary embodiments is intended to be read in connection with the accompanying drawings, which are to be considered part of the entire written description. The use of the singular includes the plural unless specifically stated otherwise. The use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the subject matter described.

Conventional wisdom has been to avoid using multiple distributed ledgers for tracking individual profiles (e.g., accounts), as the public nature of such ledgers exposes sensitive information. There is a need for overcoming the technical challenges to expanding the use of distributed ledgers.

Given concerns discussed above regarding public distributed ledgers, these ledgers have not been properly adapted to systems employing multiple secure distributed ledgers (e.g., one per client account at a financial institution). For example, given privacy concerns, techniques are not available for verifying sufficient balances exist to complete transactions between transacting account ledgers without exposing those secure distributed ledgers. As described herein, these technical problems can be overcome using a segregated database architecture. In this system, each profile (e.g., account) would be associated with its own distributed ledger as to enforce security and privacy. A central administrator may maintains a central ledger of all inter-ledger communications (e.g., transactions) to maintain a complete record of transactions without the need to share the transacting ledgers in a peer-to-peer system. This approach ensures that one transacting participant in the network does not have access to the historical transactions of the other transacting participant. Each node in the network maintains a different set of ledgers rather than a replicated list of ledgers, i.e., only those ledgers that affect that node.

Figure 1:
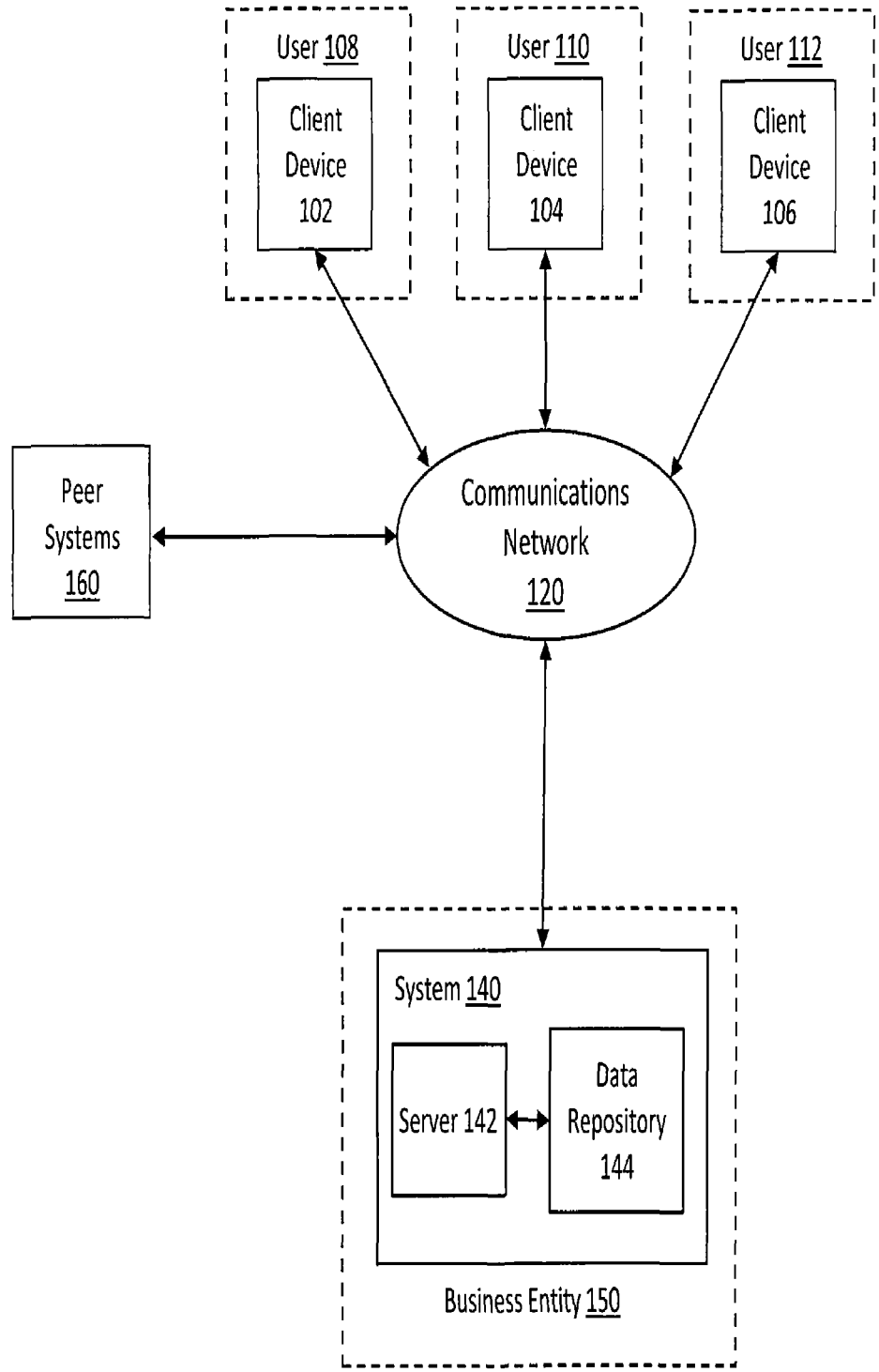
FIG. 1 is a diagram of a system in accordance with some embodiments of the present disclosure.

FIG. 1 is a block diagram of a system 100 in accordance with some embodiments of the present disclosure. System 100 may be a computing environment including client devices 102, 104, and 106, system 140, one or more peer systems 160, and a communications network 120 connecting various components of system 100. Although three client devices are shown in this example, any number of client devices may be present.

Various components of computing environment 100 are configured to address problems associated with conventional distributed ledgers, for example blockchain-based ledgers, and conventional distributed ledger architectures (e.g., a blockchain-based architecture associated with the public Bitcoin™ ledger). The conventional blockchain architecture is described below with reference to FIG. 2, and then architectures for a segregated distributed ledger, which optionally utilizes blockchain, in accordance with various embodiments are described.

Asset Tracking using Conventional Blockchain Ledgers

Figure 2:
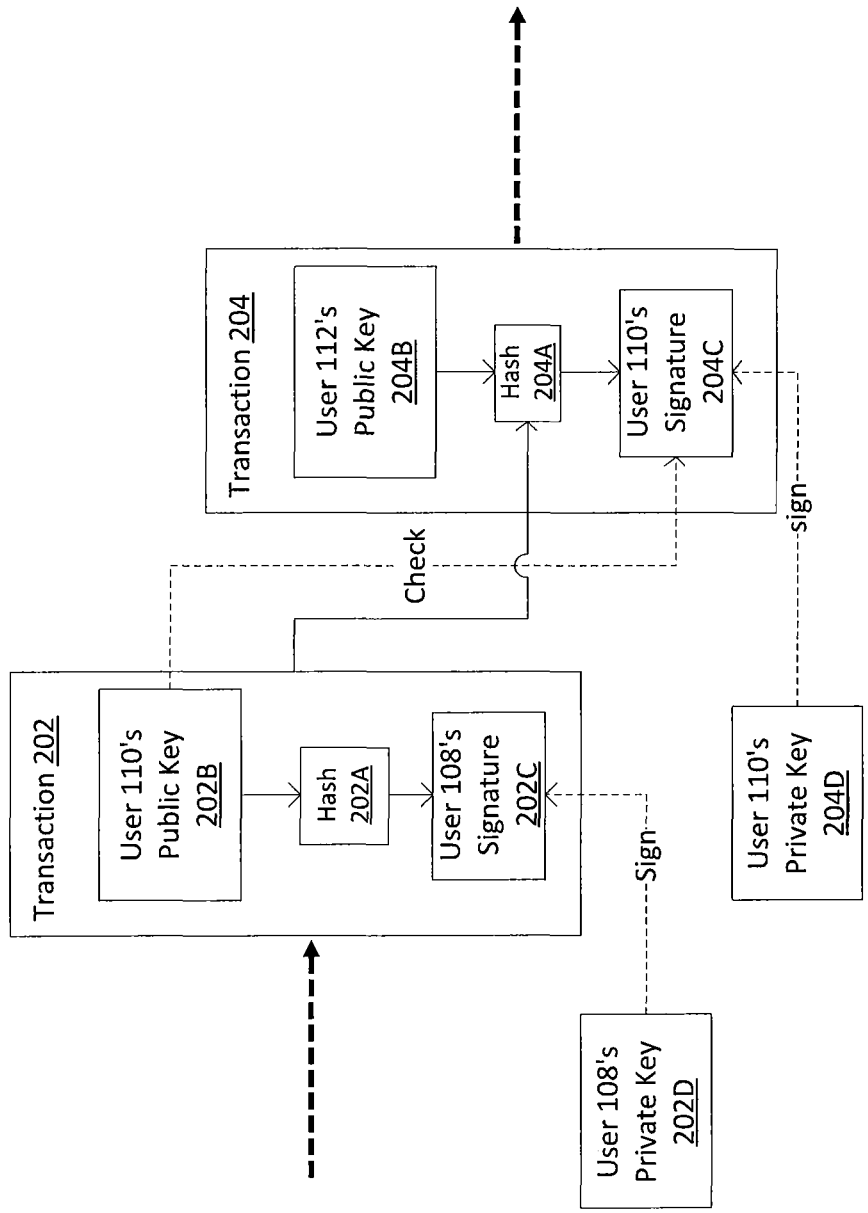
FIG. 2 is a diagram of a conventional blockchain ledger architecture.

FIG. 2 is a diagram of a structure 200 of a conventional blockchain ledger, which may be generated through the interaction of components of computing environment 100. In the example of FIG. 2, user 110 is associated with client device 104, which executes a stored software application (e.g., a wallet application) capable of obtaining a current version of a conventional blockchain ledger from one or more networked computer systems (e.g., one of peer systems 160 configured to "mine" broadcasted transaction data and update ledgers). The current version of a conventional blockchain ledger may represent a "longest" blockchain ledger that includes a maximum number of discrete "blocks." The blocks identify respective transactions that transfer and/or distribute portions of tracked assets among various owners, including user 110.

FIG. 2 shows blocks corresponding to two transactions 202 and 204, with arrows to the left and right of these transactions indicating that these are merely two transactions in a potentially longer series of chained blocks (hence the term "blockchain ledger"). In the first transaction (transaction 202) depicted in FIG. 2, user 108 transfers ownership of a portion of tracked assets (e.g., of some amount of a virtual currency or crypto-currency) to user 110. In the second transaction (transaction 204), user 110 transfers ownership to user 112. In general, any number of transactions may be supported.

Client device 104 obtains the current blockchain ledger and processes the blockchain ledger to determine that a prior owner (user 108 in this example) transferred ownership of a portion of the tracked assets to user 110 in transaction 202. One or more peer systems 160 previously verified, processed, and packed data associated with transaction 202 into a corresponding block of the conventional blockchain.

Transaction 202 includes a cryptographic hash (e.g., hash 202A) of one or more prior transactions, and a public key of the recipient (e.g., public key 202B of user 110). The transaction data may also include a digital signature 202C of user 108 (the prior owner), which is applied to hash 202A and public key 202B using a private key 202D of user 108 through any of a number of techniques apparent to one of skill in the art. The presence of user 108's public key within transaction data included within the conventional blockchain ledger facilitates verification of user 108's digital signature 202C by client device 104 and/or peer systems 160.

In the second transaction (transaction 204), user 110 transfers the tracked asset portion to user 112. For example, client device 104 may execute one or more software applications (e.g., wallet applications) that generate data specifying a transaction (e.g., transaction 204) transferring ownership of the tracked asset portion from user 110 to user 112, and further. The software application(s) transmit the generated data to one or more of peer systems 160 for verification, processing (e.g., additional cryptographic hashing) and inclusion into a new block of the blockchain ledger.

For example, data specifying transaction 204 may include a cryptographic hash 204A of prior transaction 202, a quantity or number of units of the tracked asset portion that are subject to transfer in transaction 204, and a public key of the recipient (e.g., public key 204B of user 112). Further, in some aspects, the data specifying transaction 204 may include a digital signature 204C of the user 110, which may be applied to hash 204A and public key 204B using a private key 204D of user 110. Further, and by way of example, the presence of user 110's public key 202B within transaction data included within the conventional blockchain ledger may enable various devices and systems (e.g., client devices 106, 106, and/or 108, peer systems 160, etc.) to verify user 110's digital signature 204C, as applied to data specifying transaction 204.

One or more of peer systems 160 may receive the data specifying transaction 204 from client device 104. In certain instances, peer systems 160 may act as "miners" for the blockchain ledger, and may competitively process the received transaction data (either alone or in conjunction with other data) to generate additional blocks of the ledger, which may be appended to the blockchain ledger and distributed across peer systems 160 (e.g., through a peer-to-peer network) and to other connected devices of environment 100.

Conventional blockchain ledger architectures enable the public to review the content of the ledgers and verify ownership details. The decentralized nature of conventional blockchain ledgers enables multiple distributed networks to verify the contents of a single ledger. The resulting redundancy may render conventional blockchain ledger architecture more robust than centralized server systems, and effectively eliminates the falsification of ledger data by malicious parties.

However, as discussed above, despite these positive characteristics, conventional blockchain ledger architectures have certain drawbacks when implemented by secured, high-risk systems. For example, unencrypted conventional ledger blocks may represent a security concern for transactions of sensitive nature and may represent a privacy concern for members of the general public. For instance, information indicative of an interaction of a prior asset owner and a corresponding device, as present within conventional blockchain ledgers, may represent private information that should not be available to future owners, let alone members of the public.

Various embodiments address the foregoing deficiencies of conventional blockchain ledger architectures by providing security features suitable for use in high-risk, sensitive scenarios.

Client Devices

Referring back to FIG. 1, each of client devices 102, 104, and 106 may include a computing device, such as a hashing computer, a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs)), an embedded computing device (e.g., in communication with a smart textile or electronic fabric), and any other type of computing device that may be configured to store data and software instructions, execute software instructions to perform operations, and/or display information on a display device. At least one of client devices 102, 104, and 106 may be associated with one or more users, such as users 108, 110, and 112, as shown in FIG. 1. For example, user 110 operates client device 104 and causes it to perform one or more operations in accordance with various embodiments.

Each client device 102, 104, 106 includes one or more tangible, non-transitory memories that store data and/or software instructions, and one or more processors configured to execute software instructions. Client devices 102, 104, and 106 may include one or more display devices that display information to a user and one or more input devices (e.g., keypad, keyboard, touchscreen, voice activated control technologies, or any other type of known input device) to allow the user to input information to the client device.

In one aspect, each client device 102, 104, and 106 stores in memory one or more software applications that run on the client device and are executed by the one or more processors. In some instances, each client device stores software applications that, when executed by one or more processors, perform operations that establish communications with one or more of peer systems 160 (e.g., across network 120) and that obtain, from peer systems 160, a current version of a blockchain ledger generated and maintained in accordance with various embodiments.

Each client device 102, 104, and 106 may execute the stored software application(s) to obtain data from the blockchain ledger that includes data identifying one or more tracked assets, and/or a public key of one or more users. The executed software applications may cause client devices 102, 104, and 106 to extract, from one or more accessed transaction blocks of the blockchain ledger, a copy of an encrypted and/or hashed ownership/rules portion of the transaction block(s) and/or a copy of an encrypted and/or hashed master data block (e.g., including rules permitting preconfigured and/or permissible actions involving the tracked assets). Client devices 102, 104, and 106 may provide information associated with one or more actions or transactions involving the tracked assets (e.g., information identifying the actions or transaction, information identifying the assets, a public key, a digital signature, etc.) to peer systems 160, along with copies of the encrypted and/or hashed rules engines and lists of triggering events.

In some embodiments, the stored application(s) include a wallet application provided by business entity 150 (e.g., a mobile wallet application or an application executable on a desktop computer). The wallet application is capable of initiating transactions denominated in one or more currencies, including real currencies or virtual currencies such as Bitcoin™.

Exemplary Computer Systems

System 140 may be a computing system configured to execute software instructions to perform one or more operations in accordance with various embodiments. In one aspect, system 140 is be associated with a business entity 150 (e.g., a financial institution) that provides financial accounts, financial services transactions, and investment services to one or more users (e.g., customers of business entity 150). In some aspects, system 140 is a distributed system that includes computing components distributed across one or more networks, e.g., network 120.

In one aspect, system 140 includes computing components configured to store, maintain, and generate data and software instructions. For example, system 140 may include one or more servers (e.g., server 142) and tangible, non-transitory memory devices (e.g., data repository 144). Server 142 may include one or more computing devices configured to execute software instructions to perform one or more processes in accordance with various embodiments. In one example, server 142 is a computing device that executes software instructions to perform operations that provide information to at least one other component of computing environment 100.

In one embodiment, server 142 includes a computer (e.g., a personal computer, network computer, or mainframe computer) having one or more processors that are selectively activated or reconfigured by a computer program. In one aspect, server 142 (or other computing components of system 140) may be configured to provide one or more websites, digital portals, etc., that provide services consistent with business entity 150, such as a digital banking or investment portal. For instance, server 142 may be configured to provide information associated with a requested web page over communications network 120 to client device 104, which may render the received information and present content from the web page on a display device, e.g., a touchscreen display unit.

In other aspects, server 142 (or other computing components of system 140) may be configured to provide information to one or more application programs executed by client device 104, e.g., through a corresponding application programming interface (API). For example, client device 104 may execute an application program associated with and provided by business entity 150, such a mobile banking application and/or a mobile wallet application, to provide services in accordance with various embodiments. In some instances, server 142 provides information to client devices 102, 104, and/or 106 (e.g., through the API associated with the executed application program), and client devices 102, 104, and/or 106 present portions of the information to corresponding users through a corresponding graphical user interface (GUI).

Server 142 (or other computing components of system 140) may be configured to provide to client devices 102, 104, and/or 106 (and/or receive from any of the client devices) information associated with services provided by business entity 150. For example, client device 104 may receive the transmitted information, and store portions of the information in locally accessible storage device and/or network-accessible storage devices and data repositories (e.g., cloud-based storage). In one instance, client device 104 executes stored instructions (e.g., an application program, a web browser, a mobile banking application, and/or a mobile wallet application) to process portions of the stored data and render portions of the stored data for presentation to user 110. Additionally, server 142 may be incorporated as a corresponding node in a distributed network or as a corresponding networked server in a cloud-computing environment. Furthermore, server 142 may communicate via network 120 with one or more additional servers (not shown), which may facilitate the distribution of processes for parallel execution by the additional servers.

In further aspects, business entity 150 may represent a "controlling entity" capable of regulating transactions assets (e.g., units of virtual currency, units of various financial instruments, physical assets, etc.) tracked within public-private ledgers in accordance with various embodiments.

One or more computing components of system 140 (e.g., server 142) may be configured to generate pairs of public and private blockchain keys for user 110 (e.g., user 110's public/private blockchain key pair), and to provide the generated private blockchain key to user 110 through secure, non-accessible and/or out-of-band communications (e.g., by mail, etc.). System 140 may store account identification information, such as a master account identifier for each account, in a portion of data repository 144.

Exemplary Data Repositories and Stored Data

Data repository 144 may include one or more memories that are configured to store and provide access to data and/or software instructions. Such memories may include tangible non-transitory computer-readable media that store software instructions that, when executed by one or more processors (e.g., of server 132), perform one or more operations in accordance with various embodiments. Data repository 144 may also be configured to store information relating to business entity 150, e.g., a financial institution.

For instance, data repository 144 may store customer data that uniquely identifies customers of a financial institution associated with system 140. As one example, a customer of the financial institution (e.g., any of users 108, 110, and 112) may access a web page associated with system 140 (e.g., through a web server executed by a corresponding front end), and may register for digital banking services and provide data, which may be linked to corresponding ones of users 108, 110, and/or 112, and stored as customer data within data repository 144. The stored customer data may, for example, include personal information, government-issued identifiers, employment information, and contact information. The stored customer data may also include authentication credentials associated with registered users of the financial institution, e.g., a user name, a user-specified password, a system-generated password, an alphanumeric identification number (e.g., a PIN number) specified by the users or assigned by financial system 140, biometric information, and information facilitating enhanced authentication techniques.

Data repository 144 may store rules or other parameters that regulate a distribution of the tracked assets, an initiation of one or more transactions involving the tracked assets (e.g., a sale, a transfer in ownership, a use of the tracked assets as collateral in a secured transaction etc.), and any other action involving the tracked assets and/or the ledger (e.g., processes that generate additional cryptographic key sets for users 108, 110, and/or 112, processes that recover assets tracked in the ledger, etc.).

Data repository 144 may also store a copy of a master account identifier, private crypto keys associated with users 108, 110, and 112, and additional private crypto keys associated with other users. For example, system 140 may be configured to store the private crypto keys in a data structure that includes information that associates the private crypto keys with corresponding users 108, 110, and 112, and further, may be configured to store the master account identifier in a data structure within data repository 144 that is inaccessible to users 108, 110, and/or 112 (and other users).

Exemplary Communications Networks

Communications network 120 may include one or more communication networks or media of digital data communication. Examples of communication network 120 include a local area network ("LAN"), a wireless LAN, a RF network, a Near Field Communication (NFC) network, (e.g., a "WiFi" network), a wireless Metropolitan Area Network (MAN) connecting multiple wireless LANs, NFC communication link(s), and a wide area network ("WAN"), e.g., the Internet. In accordance with various embodiments of the present disclosure, communications network 120 may include the Internet and any publicly accessible network or networks interconnected via one or more communication protocols, including, but not limited to, hypertext transfer protocol (HTTP) and transmission control protocol/internet protocol (TCP/IP). Communications protocols in accordance with various embodiments also include protocols facilitating data transfer using radio frequency identification (RFID) communications and/or NFC. Moreover, communications network 120 may also include one or more mobile device networks, such as a GSM network or a PCS network, allowing client device 104 to send and receive data via applicable communications protocols, including those described herein.

Exemplary Peer Systems

Referring back to FIG. 1, peer systems 160 may include one or more computing systems configured to execute software instructions to perform one or more operations in accordance with various embodiments. In some aspects, peer systems 160 may include computing components configured to store, maintain, and generate data and software instructions. For example, each of peer systems 160 may include one or more computing devices (e.g., a server, network computer, or mainframe computer) having one or more processors that may be selectively activated or reconfigured by executable instructions (e.g., computer programs) stored in one or more tangible, non-transitory computer-readable storage devices.

In an embodiment, one or more of peer systems 160 may be configured to receive, from client device 104 across network 120, information associated with a distribution of, transaction involving, or other action associated with one or more assets tracked within blockchain ledgers in accordance with various embodiments. For example, the received information may include, but is not limited to, data identifying at least a portion of the tracked assets, and data identifying a current owner of the portion of the tracked assets (e.g., user 110) (or a obfuscated owner identifier).

In some aspects, one or more of peer systems 160 are configured (e.g., by the executed software programs) to validate the received information and to generate a new block of the blockchain ledger that includes the received information, either alone (e.g., using a "one transaction, one block" paradigm) or in combination with information identifying additional distributions, transactions, or other actions associated with one or more tracked assets (e.g., as a multiple-transaction block). The one or more peer systems 160 may be further configured to generate one or more hashes representative of the new block, which may be appended to a prior version of the private-public ledger along with the newly generated block. In some aspects, the one or more peer systems 160 may maintain the updated versions of the distributed ledger (i.e., the latest, longest distributed blockchain ledger), and may provide the updated version of the ledger to client devices 102, 104, and/or 106 (or other client devices associated with other users) upon receipt of a request across network 120 and/or at regular or predetermined intervals.

In certain instances, and in addition to a connection with network 120, peer systems 160 may be interconnected across a peer-to-peer network (not depicted in FIG. 1) using any of the wired or wireless communications protocols outlined above. Further, in some instances, one or more of peer systems 160 may function as a "miner," where any miner may be compensated in units of a virtual currency (e.g., Bitcoin™) for validating the received data and for generating updated versions of the blockchain ledger.

Exemplary Processes for Tracking Assets using Private-Public Ledgers

In some embodiments, client devices 102, 104, and/or 106 may execute one or more stored applications that enable corresponding users to track, in conjunction with peer systems 150 and other components of computing environment 100, a disposition and distribution of one or more assets using conventional, publicly available and transparent blockchain ledgers. In some aspects, the use of public blockchain ledgers to track ownership, disposition, and distribution of actual and/or virtual assets (e.g., unit of virtual currencies, such as Bitcoin™, unit of other financial instruments and securities, physical assets, etc.) may present advantages over existing centralized server systems, such as those provided by financial institutions that leverage private ledgers.

Exemplary Blockchain Ledger Architectures

Various embodiments address problems associated with conventional block-ledger architectures in a technical manner, by providing computer-implemented systems and methods that augment a conventional blockchain ledger with a private-segregated blockchain architecture to protect both the privacy of owners of tracked assets and the confidentiality of existing transaction details maintained within the blockchain ledger.

Discrete data blocks of the conventional blockchain ledgers (e.g., as outlined above in reference to FIG. 2) may include common elements of data that may specify transactions that distribute, transfer, and/or otherwise act upon portions of tracked assets. For example, these common data elements may include, but are not limited to, input data that references one or more prior transactions (e.g., a cryptographic hash of the one or more prior transactions), output data that includes instructions for transferring the tracked asset portion to one or more additional owners (e.g., a quantity or number of units of the tracked asset portion that are subject to the transaction and a public key of the recipient), and a digital signature applied to the input and/or output data using a corresponding private key of a current owner of the tracked asset portion. Various embodiments are, however, not limited to exemplary transactions that include a transfer of tracked assets and to the exemplary data elements described above, and in further embodiments, discrete blocks of the blockchain ledgers may represent any other transaction appropriate to the tracked assets and any other data appropriate to the tracked assets and to the transaction.

In some aspects, conventional blockchain ledger architectures described above may enable the public to review content of the ledgers and verify ownerships. Further, the decentralized nature of conventional blockchain ledgers may also enable multiple distributed networks to verify the contents of a single ledger. The resulting redundancy may render conventional blockchain ledger architecture more robust than centralized server systems, and effectively eliminate the falsification of ledger data by malicious parties. However, as described above, the as-described blockchain ledger (FIG. 2) maintains all transactions of the entire system on the same blockchain, which allows any member of the network to review and determine the details of the transactions represented in the ledger. There is a need for improved systems and methods that enhance the security of blockchain ledger architectures for use with high-risk, sensitive applications. It would also be desirable to reduce or eliminate settlement delays in peer-to-peer transactions between account holders.

Embodiments described herein make use of multiple, distributed ledgers (e.g., distributed blockchains in embodiments) to track multiple data exchange (e.g., transaction) threads or accounts. In a transaction system, each participant would be assigned his or her own respective personal ledger (e.g., blockchain) to track all of the transactions pertaining to the participant, and a central tracking mechanism is used to track the relationship between all of the accounts in the system. This mechanism can be its own blockchain, database, or lookup table. By segregating each account into its own blockchain ledger, the privacy of the account holder is maintained by only posting into the public facing aspects of the network that that account is valid and allowing for a query into the ability for the account to pay for or otherwise transact a given transaction.

In this environment, upon creation of a new account, a new genesis block is generated and associated with the new account. Transactions in this environment are conducted across two different ledgers (e.g., blockchains) and can only be conducted through the validation process enabled by the central tracking mechanism. To enable transactions across two different blockchains, a unique identifier is passed from Account Holder A to Account Holder B, and Account Holder B's system verifies that the unique identifier is valid for the transaction through the central tracking mechanism. Once the validity of the unique identifier of Account Holder A is confirmed, Account Holder B's system sends a request to the system to process a transaction for a predetermined amount. Account Holder A's private key is used to confirm the transaction. The transaction is processed by appending the transaction to each account holder's blockchain in a new block, and updating the entries in the central tracking mechanism. The central tracking mechanism may be implemented using a blockchain, however historical tracking of accounts is not required at this level and could just reflect updates to existing account values.

The unique identifier may be implemented using a token generator that writes new tokens into each blockchain and into the central tracking mechanism. When an account holder initiates a transaction, the transacting device (e.g., a point-of-sale (POS) system or other transacting system) would verify with the central tracking mechanism that the token exists, and process the transaction using the token and send a request for the generation of new tokens for every party of the transaction. Each new token would need to be written into a new block for each blockchain, with the metadata record of the transaction details.

Figure 3:
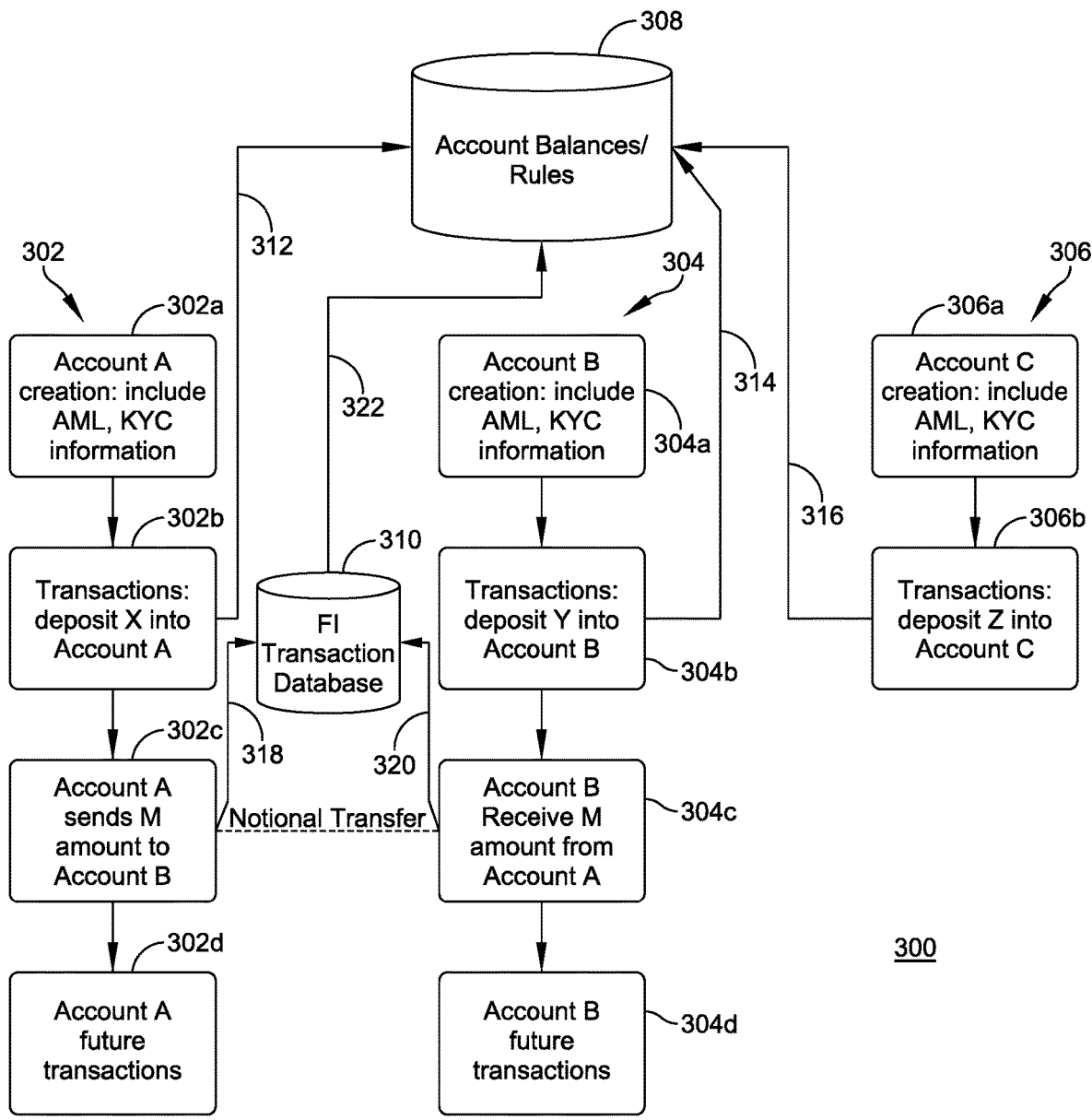
FIG. 3 is a diagram of a segregated blockchain ledger architecture in accordance with some embodiments of the present disclosures.

An embodiment of a multiple distributed ledger, for example a segregated blockchain, architecture or system is illustrated in connection with FIG. 3, specifically an embodiment illustrating account management at a financial institution. FIG. 3 illustrates a system 300 of segregated blockchains with individual, independent blockchains that are not related to one another except with respect to a central open ledger database(s) or blockchain(s) that allows peer-to-peer transactions between the independent, segregated, isolated blockchains. In this approach, each account is associated with its own blockchain. While for a large institution this approach may involve hundreds of thousands if not millions of accounts, and thus the same number of blockchains, it is expected that many blockchains will be low frequency accounts, which do not necessitate much processing power post creation of the accounts.

FIG. 3 illustrates three separate and independent blockchains 302, 304 and 306 associated with three separate and independent profiles, e.g., accounts, specifically Account A, Account B and Account C, respectively. FIG. 3 also illustrates a Financial Institution (central authority) Transaction Database 310 and an Account Balances/Rules database 308. It should be understood that in embodiments databases 308 and 310 could be one database or multiple databases. FIG. 3 shows the creation (302a, 304a, 306a) of the genesis blocks for the respective blockchains after the financial institution creates the account following performance of its internal anti-money laundering (AML) and know-your-customer (KYC) procedures. Next, funds are deposited in each of Accounts A, B and C at 302b, 304b and 306b, respectively. These transactions are reflected in new blocks on the respective blockchains 302, 304, 306. Also, the account balances are updated (at 312, 314, 316) in the Account Balances/Rules database 308, which may be in the form of a database or a blockchain ledger that records account balances for all accounts.

Now, let's assume that there is to be a data exchange (e.g., transaction) between a first individual profile (e.g., Account A) and a second individual profile (e.g., Account B), specifically Account A is to send M amount (of money or other asset) to Account B and Account B is to receive M amount from Account A. New blocks for blockchains 302, 304 are created (302c, 304c) corresponding to these transactions. In embodiments, before these blocks are created, however, the system pings the Account Balance/Rules database 308 with the account identifiers of Accounts A and B and the parameters of the transaction. This operation checks that Account A has sufficient funds to cover the transaction and that the transaction is permitted in accordance with the rules associated with each account. For example, one of the accounts may be flagged for some reason, there may be a block on the account, the account may be a child's account or the account may not be allowed to receive funds from overseas. Once this verification is done, an update (318, 320) is sent to the FI Transaction Database 310 to log the transaction in the central ledger of the financial institution. At 322, the account balances of Accounts A and B are updated in the Account Balances/Rules database 308.

FIG. 3 illustrates that the transaction involved a "notional transfer", meaning no money has effectively changed hands. Rather, new blocks have been created in the blockchains 302, 304 with new balances. It should be understood that in embodiments these blockchains 302, 304, 306 are private blockchains that are not published to the world. They are maintained securely and privately by the financial institution, with access being allowed only to the account holder and the financial institution. Public verification only occurs in the form of a check with the Account Balances/Rules database 308 which simply provides a "yes" or a "no" with respect to whether the transaction can proceed (in accordance with the account balances, the transaction amount and any rules associated with the two accounts). The Account Balances/Rules database 308 is used as an intermediary such that the Account B holder does not have a view into the private blockchain 302 of the Account A holder, and vice versa.

Additional transactions (302d, 304d) on Accounts A and B are recorded on the blockchains 302, 304 and transacted in the same manner described above for transactions 302c, 304c.

It should be understood that the blockchain approach illustrated in FIG. 3 can operate to allow transactions across accounts maintained at or by the same financial institution or across accounts maintained at different financial institutions. Each financial institution maintains its own blockchains for its own respective accounts, as well as its own Financial Transaction Database 310. The financial institutions can also maintain their own Account Balances/Rules database 308 or use a common, shared Account Balance/Rules database.

It should be apparent that embodiments described in connection with FIG. 3 provide technical benefits over conventional approaches to peer-to-peer transactions, both with respect to verification and settlement. Conventional peer-to-peer transactions involve a middle man. User A would be logged into user A's account an opt to transfer money to user B. This may result in an email being sent to user B with a link, and by clicking on the link user B can accept that as a money transfer into user B's account. Unbeknownst to the users, the middle man acts to obtain the M-amount, verify that it is in the user's account, and then send a fund available type or an "okay" signal back to account B. In the case of a PayPal®-type payment solution, a shadow account exists that is strictly meant for these transaction. This account acts as a segregated sandbox where the transaction occurs, and that pulls the money from one account and puts the money into the other account. With this conventional method there needs to be a settlement period, either for the processing by the middleman account or where account ledgers of the financial institutions involved are updated. That process can take a significant amount of time. By using the segregated blockchain approach described above, there is no requirement to settle a transfer that just occurred, because the financial transaction databases or databases get updated with the actual amount that has transferred back and forth. And the transaction is recorded in both blockchain ledgers of the account holders, meaning that settlement does not need to occur to ensure that both records match. Moreover, while conventional settlement is not required using the approach of the single blockchain described above in connection with FIG. 2, the advantage of the segregated blockchain is that user A's prior transactions are not visible to user B, because each account has its own blockchain segregated from other blockchains. This is because the only thing that is available to user B is a user A account identifier, which is used to check the transaction against the Account Balances/Rules database 308, and ultimately whether user A has sufficient funds to cover, and is permitted to take part in, the transaction. Unlike a conventional blockchain, there is no publicly available record of prior transactions on the account.

Figure 4:
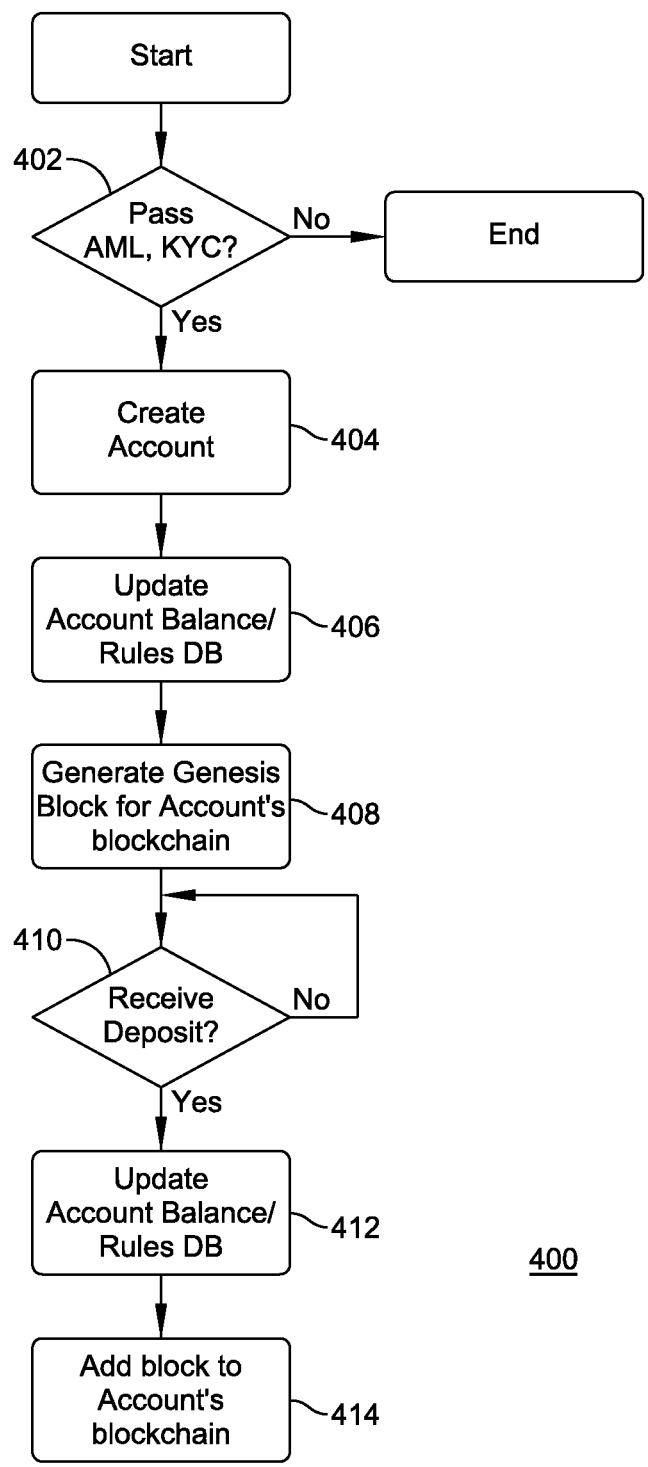
FIG. 4 is a flow diagram illustrating a process of creating and updating a segregated blockchain in accordance with some embodiments of the present disclosure.
Figure 5:
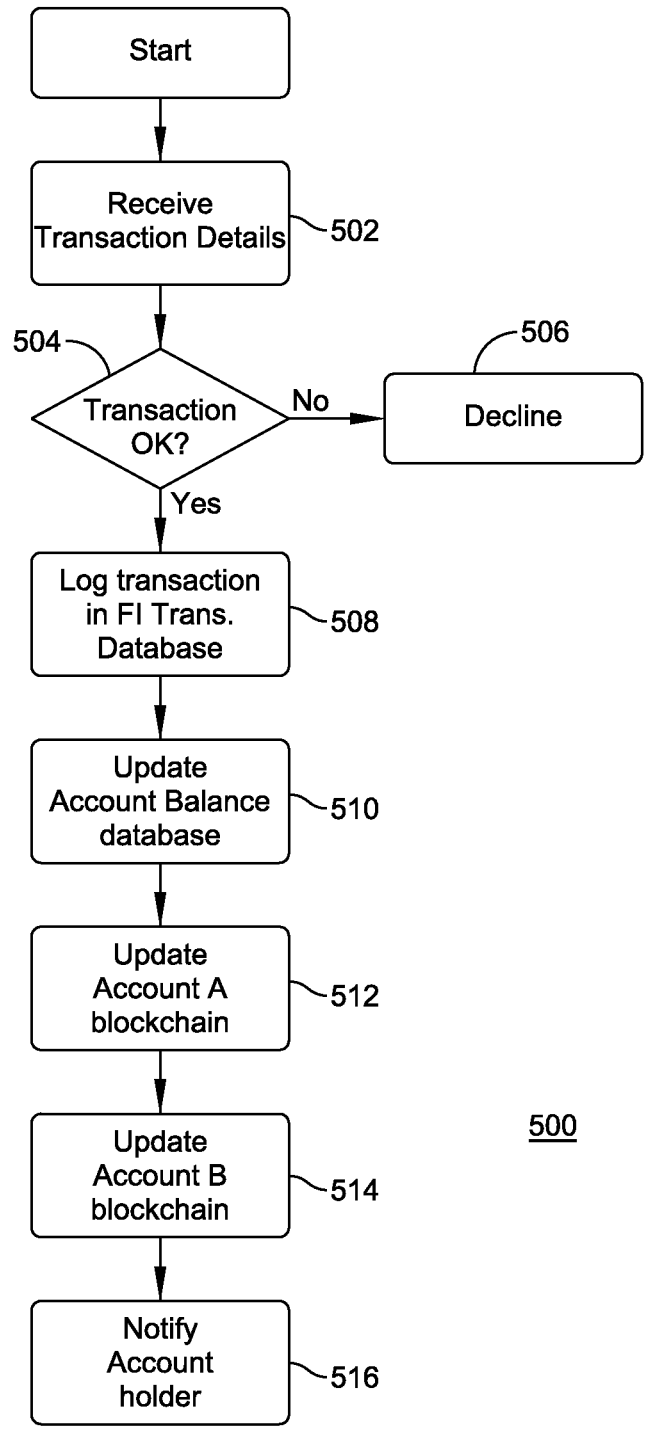
FIG. 5 is a flow diagram illustrating a process of executing a transaction in a segregated blockchain architecture in accordance with some embodiments of the present disclosure.

FIGS. 4 and 5 are flow diagrams illustrating an embodiment of steps that can be performed by a financial institution processor to implement the segregated blockchain approach to financial transactions illustrated in FIG. 3. The flow diagram of FIG. 4 illustrates the process 400 of opening an account and creating the segregated blockchain for that account.

At 402, it is determined whether the requested account has passed internal AML and KYC procedures. Assuming the account can be opened, the account is created at 404 and assigned an account number. At 406, the account is registered into the Account Balances/Rules database, including any account balance (e.g., $0 if a deposit has not been received) and any rules associated with the account (e.g., the account is associated with a minor, the account cannot receive overseas funds, etc.). At 408, a genesis block is created for the account's individual blockchain. At 410, it is determined if a deposit is received for the account. Assuming a deposit is received to fund the account, then at 412 the Account Balance/Rules database is updated with the account balance and this deposit transaction is logged in the account's blockchain by the addition of a block reflecting this transaction onto the blockchain. As described above, this step may involve loading the account's blockchain from storage, adding a new block to the blockchain, and storing the updated blockchain to storage.

The flow diagram of FIG. 5 illustrates an embodiment of a process 500 for handling a transaction between two accounts in FIG. 3. Let's assume again that Account A user wants to transfer M amount to Account B user. At 502, transaction details are received. These details can include, for example, an identifier associated with Account A, an identifier associated with Account B, the amount of the transaction, a date for the transaction, and any other details associated with the transaction. These transaction details can be received from user A, from user B or from both. By way of example, user A can log into Account A and register the transaction, which results in an email being sent to user B's email account with a URL link. When user B selects the link, indicating user B would like to accept the funds, the transaction details are provided to the process illustrated in FIG. 5. In other embodiments, the transaction can be posted to a pending queue in user B's account. User B can then log into Account B and select the transaction from the pending queue of transactions, indicating that user B would like to accept the funds, and the transaction detail are provided to the process illustrated in FIG. 5.

Next, at 504, the transaction details are compared against the Account Balances/Rules database. Specifically, the transaction amount is compared against the balance of Account A and any rules associated with Account A and Account B. If the transaction would violate a rule and/or there are insufficient funds to cover the transaction, the transaction is declined (at 506) and user B is notified. Alternatively, if the transaction does not violate any rules and sufficient funds are available to cover the transaction, then at 508 the transaction is logged in the ledger of the Financial Transaction Database. At 510, the balances of Account A and Account B are updated in the Account Balances/Rules database. At 512, a block reflecting the transaction, i.e. Account A sends M amount to Account B, is added to the blockchain associated with Account A. Specifically, the Account A blockchain is loaded, a new block is added, and the updated blockchain is stored. And at 514, a new block reflecting the transaction, i.e., Account B receives M amount from Account A, is added to the blockchain associated with Account B. Finally, at 516 the account holders are notified that the transaction is complete. This notification could be by email, by text message, by message displayed within the GUI while the users are logged in or by other means of communicating the success of the transaction.

From the foregoing, it should be appreciated that although Account A's transactions are tracked via a blockchain, Account B never gains access to Account A's past transactions, which are maintained in confidence. Instead, Account B only gets access to the result of the comparison of the transaction parameters against the account balance data and the rules within the Account Balances/Rules database. It should also be appreciated that there is no settlement delay associated with the transaction. Because transactions are immediately logged in the blockchains of Accounts A and B, the money can be made available without any delay normally associated with logging the transactions into an account ledger of the financial institution or institutions involved. Settlement is not required to ensure that all records match because the same records exist in the two blockchains of the transacting accounts and can be validated from the blockchains.

It should also be appreciated that the process works essentially the same way even if Accounts A and B are with different financial institutions. In that case, the two financial institutions can either share a common Account Balances/Rules database (e.g., via agreement between the institutions), the Account Balances/Rules database can be maintained by a separate central authority, or each institution can maintain its own Account Balances/Rules database that can be checked by or on behalf of the other institution. The only difference is that each financial institution updates its own Financial Transaction Database and its own account's blockchain to reflect the transaction. In embodiments, a central authority running the system would require all participants in the system to maintain a common account balance/rules database, so it would in effect be a shared central database that is controlled by a set of agreed rules between, for example, distinct financial institutions. Again, a settlement period is not required and funds can be transferred between the financial institutions at a later time, with confidence that the same transaction is registered in both Account A's and Account B's blockchain ledgers.

Figure 6:
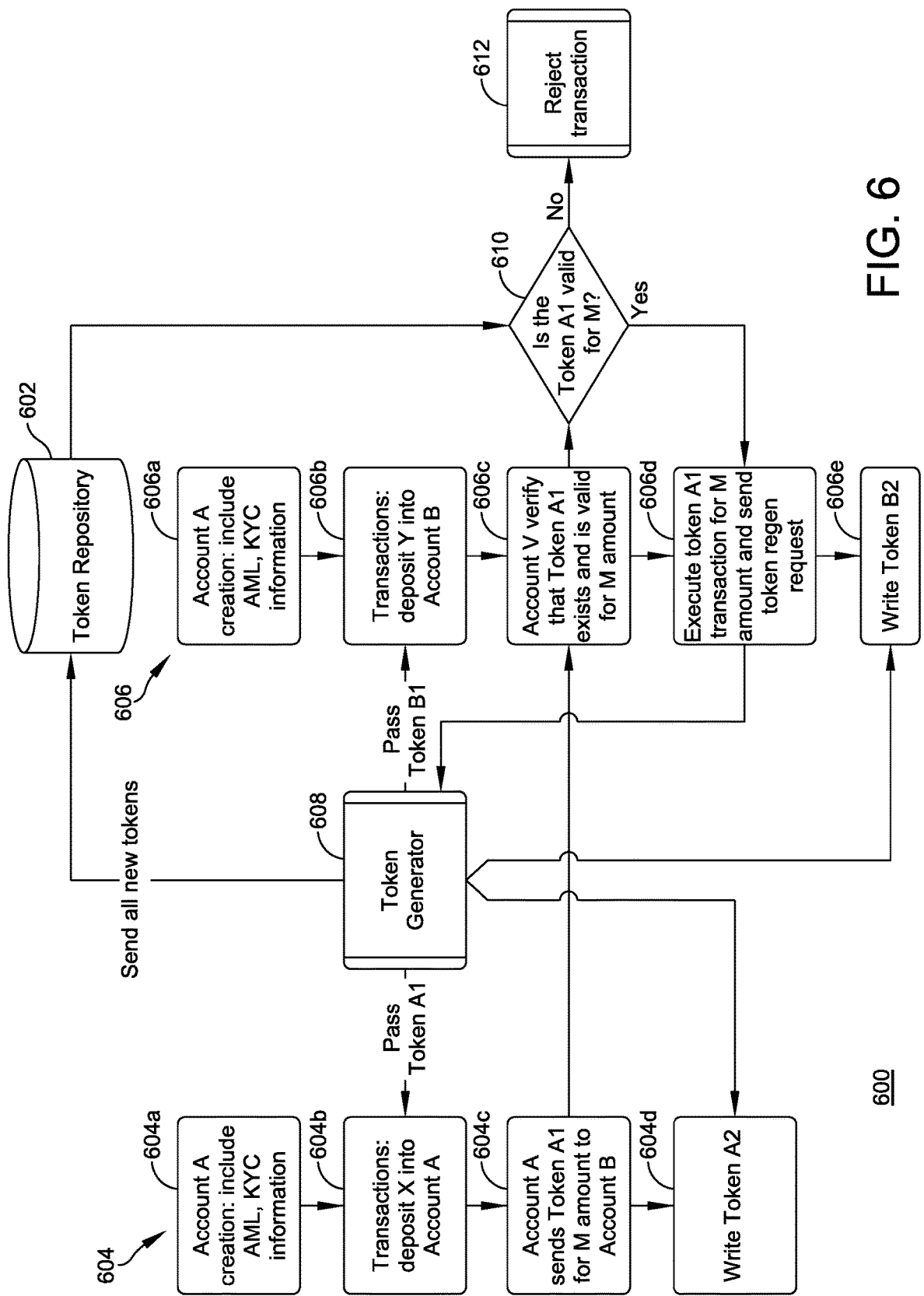
FIG. 6 is a diagram of a segregated blockchain ledger architecture that uses tokens for transactions in accordance with some embodiments of the present disclosures.

FIG. 6 illustrates an embodiment of a segregated blockchain system or architecture 400, in accordance with certain embodiments, that uses tokens as a way of transferring assets, such as money, between accounts. As will be appreciated, tokens actually hold value. They are effectively electronic checks. Therefore, transactions can be completed automatically without a further settlement process as would be employed conventionally by a financial institution. A token exists in a storage location with an address and a key and can be retrieved from the address. The embodiment illustrated in FIG. 6 allows for the transfer of funds through segregated blockchains without a centralized server. This system can be used to allow for direct peer-to-peer transfers, such as to implemented a PayPal®-type service.

The system 600 includes a token repository 602 where tokens reside. The token repository may be included as part of the Account Balances/Rules 308 database of FIG. 3. Blockchains 604, 606 are created and associated with Accounts A and B, respectively. As with FIG. 3, at 604a, 606a, genesis blocks are created for each blockchain ledger after internal anti-money laundering (AML) and know-your-customer (KYC) procedures are completed.

At 604b, a special transaction is recorded in Account A's blockchain 604. For example, an amount X is deposited into Account A. This transaction is recorded on the blockchain and associated with a token A1 that is generated by the token generator 608. Each account is associated with a single token at a given point in time. As such, token A1 is associated with Account A's current balance and any associated rules for the account, and stored in token repository 602. This method ensure that the account holder (e.g., customer) has a single token that defines its current balance and account number. By ensuring that everything is stored in a single token, the counter-party to a transaction is not required to make multiple lookups or do any analysis of the transaction to determine the applicable rules for the transaction. In the same manner, when a deposit is made to Account B, token B1 is generated and this transaction and the current Account B token, i.e., token B1, are reflected in a new block of the Account B blockchain (at 606b). Token B1 is also stored in the token repository 602.

Now, assume there is to be a peer-to-peer transaction between Account A and Account B, specifically Account A is to transfer M amount to Account B. In this instance, Account A sends token A1 to Account B for M amount at 604c. In embodiments, this transmission (which has not been executed on yet) is reflected as a new block on the blockchain 604. This allows for transactions to proceed even when a connection to the network is weak or unavailable. In this embodiment, transactions can proceed using the system by growing the local blockchain to include the original token plus all subsequent transactions. Thus, an updated picture of the accounts can be maintained in the local copies until a connection to the account identifier is available to confirm all of the transactions. At 606c, Account B verifies through the Token Repository 602 that token A1 exists and is valid for M amount. This verification does not have to be reflected on the blockchain 606, but it is needed to generate a new token for user B that includes all previous transactions. If the token is not valid (at 610), the transaction is rejected at 612. If the token is valid (at 610), then Account B executes the token A1 transaction for M amount (at 608d) and sends a token generation request to the token generator 608. The token generator generates new token A2 for Account A and new token B2 for Account B, which are written into the blockchains 604, 606 as blocks 604d, 606e, respectively. New Token A2 is associated with the updated balance (original balance of Account A minus M amount) of Account A, and token B2 is associated with the updated balance (original balance of Account B plus M amount) of Account B.

It should be understood that anybody who has a token, plus a private security key (i.e., a private key maintained at the user's device and used to gain access to the account identifier module of the token repository), can access the funds associated with a token into his or her own account. It should also be understood that tokens are reflectable in that you can associate rules for what can and cannot be done with them, e.g., timeouts, requirement for multiple signatures, etc. These features are well-known aspects of token-based systems. But, with respect to conventional token systems, the benefit of the approach of FIG. 6 is that the approach of FIG. 6 leverages all the benefits of a token system, while also recording transactions involving those tokens on segregated blockchains. This approach allows transactions to be processed without losing track of what is happening with the tokens for each individual account. And new tokens are generated in real time, rather than in batch (e.g., at the end of a business day). Because all transactions are written into the segregated blockchains, it is possible to track all the tokens that are being processed. This allows for much easier auditing, e.g., tracking of token movement. It allows for simplified checking of where an individual token came from, what it is, who generated it, where it is currently sitting, what happened with it, what an account holder's instructions were with respect to it and the like. With conventional token-based systems, tokens are generated but not tracked beyond the token information being reflected in the token repository.

While conventional token systems allow users to write expiration rules around the token, the users cannot tell whether the token execution is in process or that token is sitting in queue. Let's assume the example of Account A trying to transact with Account B in an offline mode. For example, Account A is sending a token to Account B that is a one-time use token, with a timestamp and with an expiration date. In the current token world, Account A passes the token to Account B, but because this token has an expiration date on it and because the transaction is occurring in an off-line mode in accordance with the terms of the transaction, by the time Account B's user reaches a network connection, the token may have expired. Because there is no token transaction tracking in this system, Account B has no record of the transaction (other than having received the token) that indicates that the transaction should be allowed and Account B should be able to claim that token. In short, Account B has no recourse. In contrast, with the approach of FIG. 6, the transaction will be recorded in the blockchain with the transaction details, including a time stamp. In this example, since operating in off-line mode, the blockchain is updated locally by the users' wallet applications and then transferred to the financial institution processor for inclusion in the blockchains 604, 606. Therefore, the financial institution can verify the transaction through the blockchains of Accounts A and B and the transaction can be approved. Transactions are assumed processed as of the timestamp of the transaction, and verifiable through the blockchain, rather than at the time of the network connection, which maybe later.

It should be appreciated that even though the transaction can occur in an offline mode, where the token repository is not available for verification purposes, each account is associated with only one valid token at a given point in time and there is no opportunity for Account A to double spend that token or the amount M. That is, each transaction has a timestamp and it can be confirmed against the local copy of the blockchain that Account A has already spent M amount (from the previous transaction on the local copy of the blockchain). Therefore, the user's wallet application will know, from accessing the blockchain, that those funds have been spent and the newly proposed transaction is not valid and should not be permitted. It should be noted that the latest version of the blockchain ledger is not needed, as the wallet application can make use of the last token and any transaction that has occurred since the last token regeneration.

Figure 7:
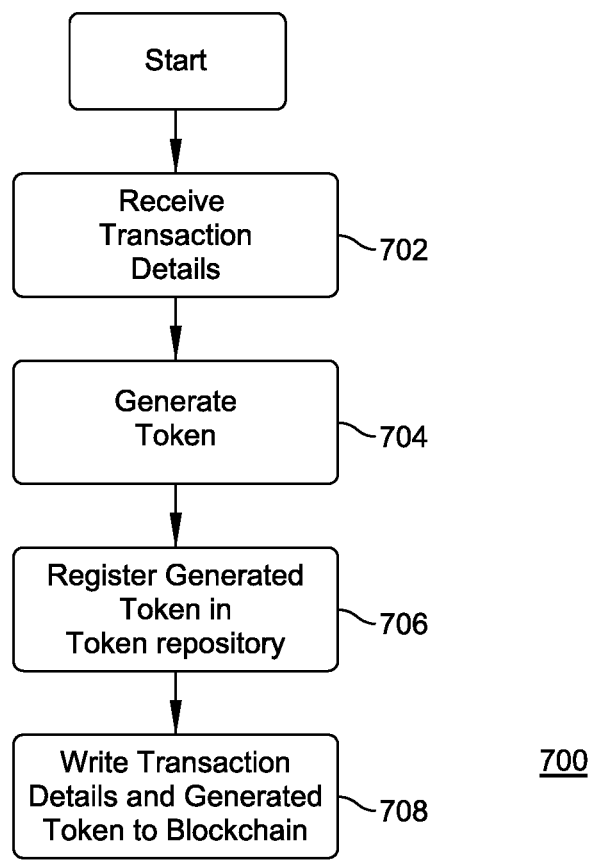
FIG. 7 is a flow diagram illustrating a process of updating a segregated blockchain with a special transaction in accordance with some embodiments of the present disclosure.

The flow diagram of FIG. 7 illustrates an embodiment of a process 700 executed by a processor for handling a special transaction (i.e., a non peer-to-peer transaction involving an account, such as a deposit) in the combination token and segregated blockchain embodiment illustrated in FIG. 6. At 702, the processor receives the transaction details. For example, these details may include an account identifier, a time stamp and a deposit amount. At 704, the processor generates a token associated with the account and reflecting the updated balance of the account. At 706, this generated token is registered into the token repository. At 708, the transaction details and the generated token are written into a new block of the blockchain associated with the transacting account.

Figure 8:
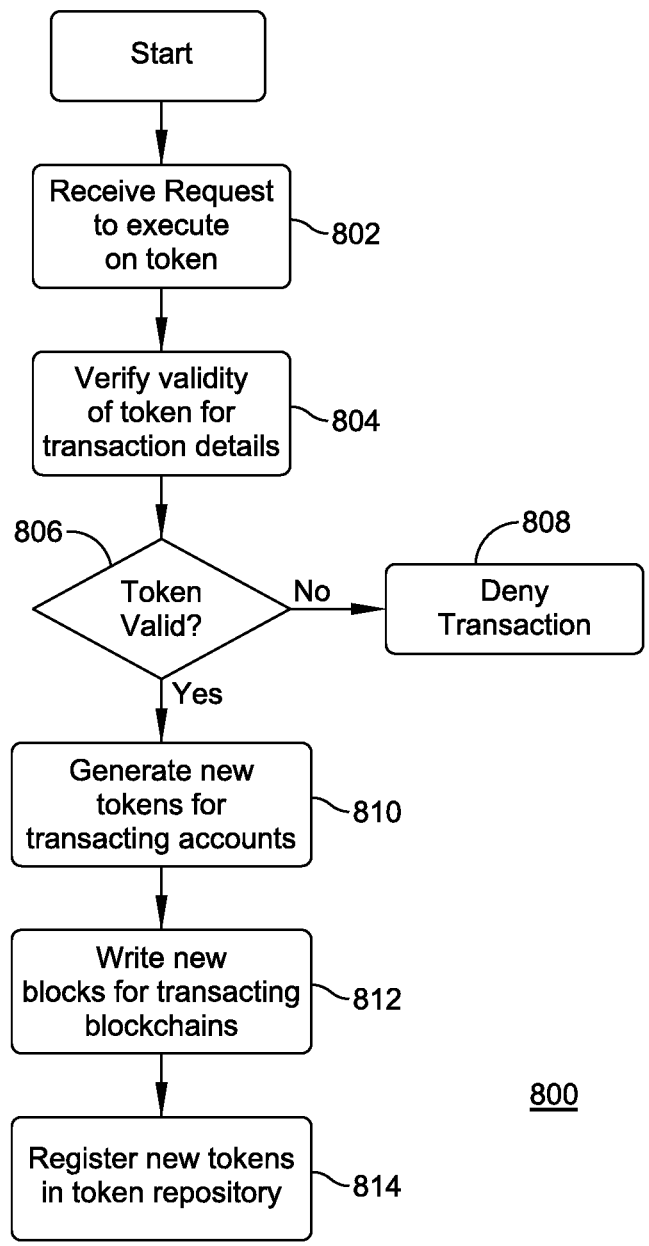
FIG. 8 is a flow diagram illustrating a process of executing a transaction in a segregated blockchain architecture using tokens for transactions in accordance with some embodiments of the present disclosure.

The flow diagram of FIG. 8 illustrates an embodiment of a process 800 executed by a processor for handling a peer-to-peer transaction between two accounts in the combination token and segregated blockchain embodiment illustrated in FIG. 6. This process begins with the assumption that the user for Account A has sent a token A1 to the user for Account B (e.g., via an email) for M amount. That is, the transaction is initiated by Account A sending the token A1 directly to Account B, without initiating the transaction through the financial institution, which allows the transaction to initiate in an offline condition if needed.

At 802, the processor receives a request from Account B to execute on the token A1. This request includes the transaction details, which include the token A1, an Account A identifier, an Account B identifier, the transaction amount, any limitations on the transaction (e.g., rules such as expiration date, double signature, etc.) and a private key. The private key is Account B's private key to initiate the transaction, as it is passing the token generated by Account A to Account B's financial institution. The private key is used to authenticate Account B's device to the Account B financial institution network. At 804, the processor checks to see whether the transaction is valid. This step involves checking the token and transaction parameters against the token repository (see 602 in FIG. 6). If at step 806 the token is not valid for the transaction parameters (e.g., the token cannot be verified, there are insufficient funds, the transaction time is outside of the time parameters set for the transaction, a signature is missing, etc.), then the processor rejects the transaction. If at step 806 the token is valid for the transaction parameters, then the processor executes the transaction as follows. At 810, the processor generates two new tokens for the transacting accounts. The first new token reflects the update in the balance of Account B, and the second new token reflects the update in the balance of Account A. Then, at step 812, the processor accesses the Account A blockchain and creates a new block reflecting the transaction details and the new Account A token, and accesses the Account B blockchain and creates a new block reflecting the transaction details and the new Account B token. Also, at step 814, the newly generated tokens are sent to and registered (stored) into the token repository database.

The flow of FIG. 8 could occur in an online or offline mode. If the transaction originally occurs in an offline mode, then the steps reflected in FIG. 8 occur after Account B's user device gains a network connection and transfers the transaction details to the processor through the connection.

Embodiments described herein operate with multiple independent, private blockchains rather than a single public blockchain ledger. This approach avoids the inherent privacy risks of single blockchain based systems. In such systems, if data is not encrypted it is public. And even if the data is encrypted, patterns of transactions can still be discerned by examining the public ledger. Embodiments described herein also provide benefits over conventional financial transaction systems in terms of settlement time and auditing.

Although the invention has been described in terms of exemplary embodiments, it is not limited thereto. Rather, the appended claims should be construed broadly to include other variants and embodiments of the invention that may be made by those skilled in the art without departing from the scope and range of equivalents of the invention.

What is claimed is:

1. An apparatus, comprising:
   a communications interface;
   a storage device storing instructions; and
   at least one processor coupled to the storage device, the at least one processor being configured to execute the instruction to:
   receive, via the communications interface, first information comprising parameter values that characterize an exchange of data between a first counterparty and a second counterparty, the parameter values comprising an identifier of a first account of the first counterparty, an identifier of a second account of the second counterparty, and a transaction amount associated with the data exchange;
   access (i) a first distributed ledger associated with the first counterparty and (ii) a second distributed ledger associated with the second counterparty, the first and second distributed ledgers comprising ledger blocks that track prior exchanges of data involving corresponding ones of the first and second counterparties, the first distributed ledger being inaccessible to the second counterparty, and the second distributed ledger being inaccessible to the first counterparty;
approve the data exchange based on a comparison between the first information and counterparty data maintained within a segregated database; and
generate an additional ledger block that includes second information indicative of the approved data exchange, and perform operations that record the additional ledger block onto the first and second distributed ledgers.

2. The apparatus of claim 1, wherein:
the at least one processor is further configured to approve the data exchange for execution based on a comparison between at least one of the parameter values and a corresponding portion of the counterparty data; and
the second information comprises at least subset of the parameter values.

3. The apparatus of claim 2, wherein the at least one processor is further configured to:
obtain rules data associated with the data exchange, the rules data specifying one or more rules established by a centralized authority;
based on portions of the parameter values and the rules data, determine that the execution of the data exchange is consistent with the one or more established rules; and
approve the data exchange for execution in response to the determination.

4. The apparatus of claim 3, wherein the at least one processor is configured to:
access a third distributed ledger associated with the centralized authority; and
extract at least a portion of the rules data from a ledger block of the third distributed ledger.

5. The apparatus of claim 2, wherein the at least one processor is further configured to:
execute the approved data exchange in accordance with the parameter values;
generate third information characterizing the executed data exchange and store the third information within a portion of a transaction database; and
generate and transmit, via the communications interface, data confirming the execution of the approved data exchange to a device associated with at least one of the first counterparty or the second counterparty.

6. The apparatus of claim 5, wherein the at least one processor is further configured to transmit, via the communications interface, the third information to one or more peer computing systems, the one or more peer computing systems being configured to perform operations that record the third information within ledger block of a third distributed ledger, the third distributed ledger being accessible to the apparatus.

7. The apparatus of claim 2, wherein:
the data exchange comprises a transaction involving the first account of the first counterparty and the second account of the second counterparty;
the first distributed ledger is associated with the first account;
the second distributed ledger is associated with the second account; and
the counterparty data comprises an account balance of at least one of the first account or the second accountant.

8. The apparatus of claim 1, wherein the at least one processor is further configured to generate updated counterparty data that reflects the execution of the data exchange and to store the updated counterparty data within a portion of the segregated database.

9. The apparatus of claim 1, wherein the at least one processor is further configured to transmit, via the communications interface, the second information to one or more peer computing systems, the one or more peer computing systems being configured to perform operations that record the additional ledger block onto the first and second distributed ledgers.

10. The apparatus of claim 1, wherein:
the segregated database is maintained apart from the first and second distributed ledgers; and
the at least one processor is further configured to perform additional operations that establish a genesis block for each of the first and second distributed ledgers and that associate each of the first and second distributed ledgers with a profile of a corresponding one of the first and second counterparties.

11. A computer-implemented method, comprising:
receiving, by at least one processor, first information comprising parameter values that characterize an exchange of data between a first counterparty and a second counterparty, the parameter values comprising an identifier of a first account of the first counterparty, an identifier of a second account of the second counterparty, and a transaction amount associated with the data exchange;
by the at least one processor, accessing (i) a first distributed ledger associated with the first counterparty and (ii) a second distributed ledger associated with the second counterparty, the first and second distributed ledgers comprising ledger blocks that track prior exchanges of data involving corresponding ones of the first and second counterparties, the first distributed ledger being inaccessible to the second counterparty, and the second distributed ledger being inaccessible to the first counterparty;
approving, by the at least one processor, the data exchange based on a comparison between the first information and counterparty data maintained within a segregated database; and
by the at least one processor, generating an additional ledger block that includes second information indicative of the approved data exchange, and performing operations that record the additional ledger block onto the first and second distributed ledgers.

12. The computer-implemented method of claim 11, wherein:
the approving comprises approving the data exchange for execution based on a comparison between at least one of the parameter values and a corresponding portion of the counterparty data; and
the second information comprises at least subset of the parameter values.

13. The computer-implemented method of claim 12, further comprising:
obtaining, by the at least one processor, rules data associated with the data exchange, the rules data specifying one or more rules established by a centralized authority;
based on portions of the parameter values and the rules data, determining, by the at least one processor, that the execution of the data exchange is consistent with the one or more established rules; and
by the at least one processor, approving the data exchange for execution in response to the determination.

14. The computer-implemented method of claim 13, further comprising:

obtaining, by the at least one processor, a third distributed ledger associated with the centralized authority; and extracting, by the at least one processor, at least a portion of the rules data from a ledger block of the third distributed ledger.

15. The computer-implemented method of claim 12, further comprising:

by the at least one processor, executing the approved data exchange in accordance with the parameter values;

generating, by the at least one processor, third information characterizing the executed data exchange and store the third information within a portion of a transaction database; and transmitting, by the at least one processor, data confirming the execution of the approved data exchange to a device associated with at least one of the first counterparty or the second counterparty.

16. The computer-implemented method of claim 15, further comprising transmitting, by the at least one processor, the third information to one or more peer computing systems, the one or more peer computing systems being configured to perform operations that record the third information within a ledger block of a third distributed ledger, the third distributed ledger being accessible to the apparatus.

17. The computer-implemented method of claim 11, further comprising, by the at least one processor, generating updated counterparty data that reflects the execution of the data exchange and storing the updated counterparty data within the segregated database.

18. The computer-implemented method of claim 11, wherein performing the operations comprises transmitting the second information to one or more peer computing systems, the one or more peer computing systems being configured to perform operations that record the additional ledger block onto the first and second distributed ledgers.

19. The computer-implemented method of claim 11, wherein:

the segregated database is maintained apart from the first and second distributed ledgers; and the method further comprises, by the at least one processor, performing additional operations that establish a genesis block for each of the first and second distributed ledgers and that associate each of the first and second distributed ledgers with a profile of a corresponding one of the first and second counterparties.

20. A tangible, non-transitory computer-readable medium storing instructions that, when executed by at least one processor, cause the at least one processor to perform a method, comprising:

receiving first information comprising parameter values that characterize an exchange of data between a first counterparty and a second counterparty, the parameter values comprising an identifier of a first account of the first counterparty, an identifier of a second account of the second counterparty, and a transaction amount associated with the data exchange;

accessing (i) a first distributed ledger associated with the first counterparty and (ii) a second distributed ledger associated with the second counterparty, the first and second distributed ledgers comprising ledger blocks that track prior exchanges of data involving corresponding ones of the first and second counterparties, the first distributed ledger being inaccessible to the second counterparty, and the second distributed ledger being inaccessible to the first counterparty;

approving the data exchange based on a comparison between the first information and counterparty data maintained within a segregated database; and generating an additional ledger block that includes second information indicative of the approved data exchange, and performing operations that record the additional ledger block onto the first and second distributed ledgers.

* * * * *